United States Patent [19]
Frick

[11] Patent Number: 4,748,852
[45] Date of Patent: Jun. 7, 1988

[54] TRANSMITTER WITH AN IMPROVED SPAN ADJUSTMENT

[75] Inventor: Roger L. Frick, Chanhassen, Minn.
[73] Assignee: Rosemount Inc., Eden Prairie, Minn.
[21] Appl. No.: 917,790
[22] Filed: Oct. 10, 1986
[51] Int. Cl.[4] .................................................. G01L 9/12
[52] U.S. Cl. ........................................ 73/718; 73/724; 73/753
[58] Field of Search ................. 73/708, 709, 711, 717, 73/718, 719, 720, 721, 722, 723, 724, 725, 726, 727, 728, 733, 734, 735, 745, 746, 749, 750, 753, 754; 374/172, 174; 364/466

[56] References Cited

U.S. PATENT DOCUMENTS

| | | | |
|---|---|---|---|
| 3,646,538 | 2/1972 | Frick | 340/200 |
| 3,764,880 | 10/1973 | Rose | 321/2 |
| 3,916,689 | 11/1975 | Donnelly | 73/304 C |
| 3,975,719 | 8/1976 | Frick | 340/200 |
| 4,120,201 | 10/1978 | Wargo | 73/361 |
| 4,143,550 | 3/1979 | Kobayashi | 374/172 |
| 4,145,619 | 3/1979 | Tseng | 307/118 |
| 4,149,231 | 4/1979 | Bukosky et al. | 363/59 |
| 4,181,946 | 1/1980 | Loshbough et al. | 364/466 |
| 4,289,035 | 9/1981 | Lee | 73/708 |
| 4,381,677 | 5/1983 | Reusch et al. | 73/718 |
| 4,502,003 | 2/1985 | Frick | 323/275 |

OTHER PUBLICATIONS

Graeme; Jerald G., *Designing with Operational Amplifiers*, McGraw-Hill Book Company, 1977, pp. 19–23.

*Primary Examiner*—Donald O. Woodiel
*Attorney, Agent, or Firm*—Kinney & Lange

[57] ABSTRACT

A transmitter senses a process variable and provides a two-wire output adjusted by a span adjustment. The transmitter has a sensor which senses the process variable and provides a sensor signal. An output circuit provides a two-wire output representative of the sensed process variable. A span-controlling circuit is coupled between the sensor and the output circuit and receives a span adjustment. The span-controlling circuit includes an amplifier coupled to a potentiometer which adjusts the span based on the span adjustment. The wiper of the potentiometer is connected to the amplifier output so that one portion of the potentiometer resistance provides feedback from the amplifier output to the amplifier input. A second portion of the potentiometer resistance is coupled between the amplifier output and the output circuit. Both portions of resistance affect both the span and the resolution of the output. The arrangement provides an improved resolution over a wide turndown-ratio.

13 Claims, 3 Drawing Sheets

TRANSMITTER WITH AN IMPROVED SPAN ADJUSTMENT

BACKGROUND OF THE INVENTION

1. Field of the Invention

This invention relates to a two-wire process variable transmitter with an adjustable span.

SUMMARY OF THE INVENTION

This invention relates to a transmitter which senses a process variable and provides a two-wire output representative of the process variable. The process variable can comprise a pressure, temperature, flow or other process variable. The transmitter receives a span adjustment which adjusts the span of the transmitter's output. The transmitter comprises sensing means which sense the process variable and provide a sensor output representative of the process variable. The transmitter further comprises span-controlling means coupled to the span adjustment and the sensor output. The span-controlling means control the two-wire output. The span-controlling means further comprise first impedance means for adjusting the span. The first impedance means have a first impedance which increases responsive to a span adjustment increase. The span-controlling means further comprise second impedance means for adjusting the span. The second impedance means have a second impedance which decreases responsive to a span adjustment increase. The first and second impedance means are coupled to the sensor output such that the two-wire output has an increased resolution as a function of span adjustment. The transmitter further comprises output means which couple to the span-controlling means. The output means provide the two-wire output.

In a preferred embodiment, the transmitter further comprises adjustment means for receiving the span adjustment. The adjustment means are coupled to the span-controlling means. The span adjustment is coupled through the span adjustment means to the span-controlling means to control the magnitudes of the first and second impedances. In a further preferred embodiment, the span-controlling means further comprise amplifier means having an input and output coupled to the first and second impedance means for amplifying the sensor output. The first impedance means can be coupled between the amplifier's output and the output means to provide a feedforward control of the transmitter's span. The second impedance means can be coupled between the amplifier's input and output to provide feedback control of the amplifier's gain. Both the feedforward and the feedback controls of span affect the output resolution. The two effects on output resolution combine to give the desired output resolution over a selected turn down ratio. The transmitter is thus useful for sensing over a wide turn down ratio range and the undesired resolution limitations of the first and second impedance means are substantially overcome.

In a further preferred embodiment, the first and second impedance means together comprise a variable resistance, such as a potentiometer. The potentiometer has an adjustable tap which is coupled to the amplifier's output to provide the desired high resolution. In yet another preferred embodiment, the two-wire output is a 4 to 20 milliampere current which energizes the transmitter. The sensor means can comprise a capacitive pressure sensor.

DETAILED DESCRIPTION OF THE PREFERRED EMBODIMENTS

Figure 1:
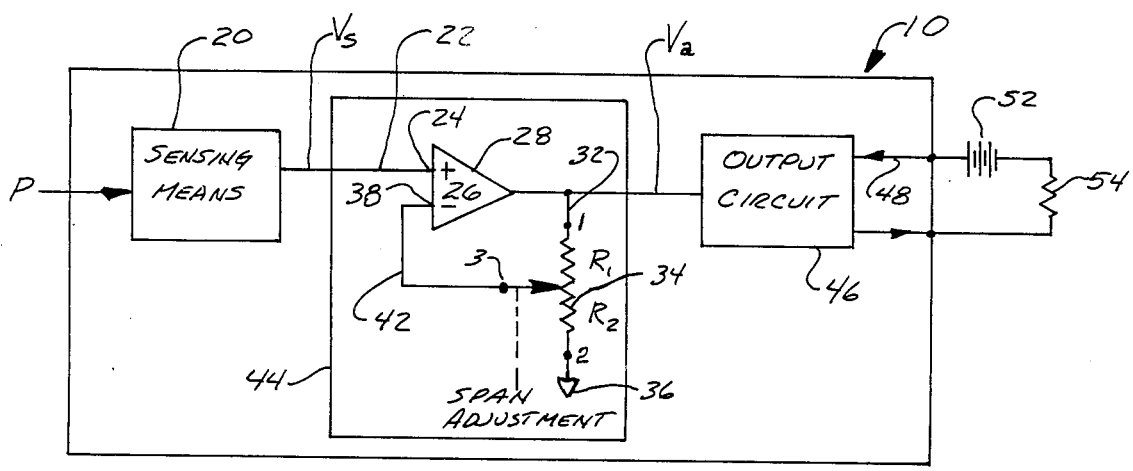
FIG. 1 is a part schematic, part block diagram representation of a PRIOR ART transmitter with a span adjustment.

An exemplary PRIOR ART transmitter is shown schematically at 10 in FIG. 1. A process pressure P couples to a sensing means 20 which capacitively senses the process pressure P and provides a sensor output Vs on conductor 22. The output Vs on conductor 22 has an amplitude which is representative of the sensed pressure P. A non-inverting input 24 of operational amplifier 26 senses the sensor output. The output 28 of operational amplifier 26 is coupled via conductor 32 to terminal 1 of span adjustment potentiometer 34. Terminal 2 of span adjustment potentiometer 34 is coupled to a fixed reference potential (DC common) 36. The wiper of the potentiometer, terminal 3, is connected to an inverting input 38 of operational amplifier 26 via conductor 42. The potentiometer 34 presents a resistance R1 between terminals 1 and 3 and presents a resistance R2 between terminals 3 and 2. The potentiometer has a resolution associated with it that is determined by the smallest increment of resistance—"delta R" that can be practically adjusted with the potentiometer. The resolution (delta R/(R1+R2)) of the potentiometer is the ratio of the smallest practical increment of adjustment "delta R" of the potentiometer to the total resistance (R1+R2) of the potentiometer.

The amplifier 26 and the potentiometer 34 comprise a gain stage 44 which receives the sensor output Vs and provides a span-adjusted output Va. The gain of the output stage is the ratio of (delta Va/delta Vs) which is controlled by the potentiometer adjustment according to the formula:

$$\text{Gain} = \frac{\text{delta } Va}{\text{delta } Vs} = (R1 + R2)/R2 \qquad \text{Eq. 1}$$

Where delta Vs is a change in the magnitude of the sensor output and delta Va is a corresponding change in the span-adjusted output.

The span-adjusted output Va is applied to an output circuit 46 which provides a 4–20 mA output signal 48 to a two-wire current loop comprising a power source 52 and a load impedance 54 coupled together in series. The transmitter's span is a ratio of a change of output current to a change of input pressure. In such a transmitter it is desirable to adjust the span so that the transmitter is adaptable to a variety of input pressures. For example, when a transmitter is used in one application it may be desirable to have a 16 mA change in output current represent a 10 psi input pressure change, but when the same transmitter is used in another application it must be adjusted so that a 16 mA change in output current represents a 100 psi input pressure change. In such a transmitter it is desirable to adjust the transmitter's span with a high degree of resolution over a wide range of span setting. The ratio of a transmitter's maximum span setting to its minimum span setting is referred to as a "turn down ratio". It is found with prior art transmitter 10 that the turn down ratio of the transmitter is limited by the output resolution of the gain adjusting circuitry in the transmitter. The output resolution is defined to be the ratio of the smallest practical increment of adjustment delta Va of the span-adjusted voltage divided by the span-adjusted voltage Va. In the transmitter depicted in FIG. 1 the output resolution (delta Va/Va) of the gain adjusting circuit comprising operational amplifier 28 and potentiometer 34 is found $$\frac{\text{delta } Va}{Va} = \frac{\text{delta } R}{(R1 + R2)} \cdot \frac{(R1 + R2)}{R2} \quad \text{Eq. 2}$$

Figure 2:
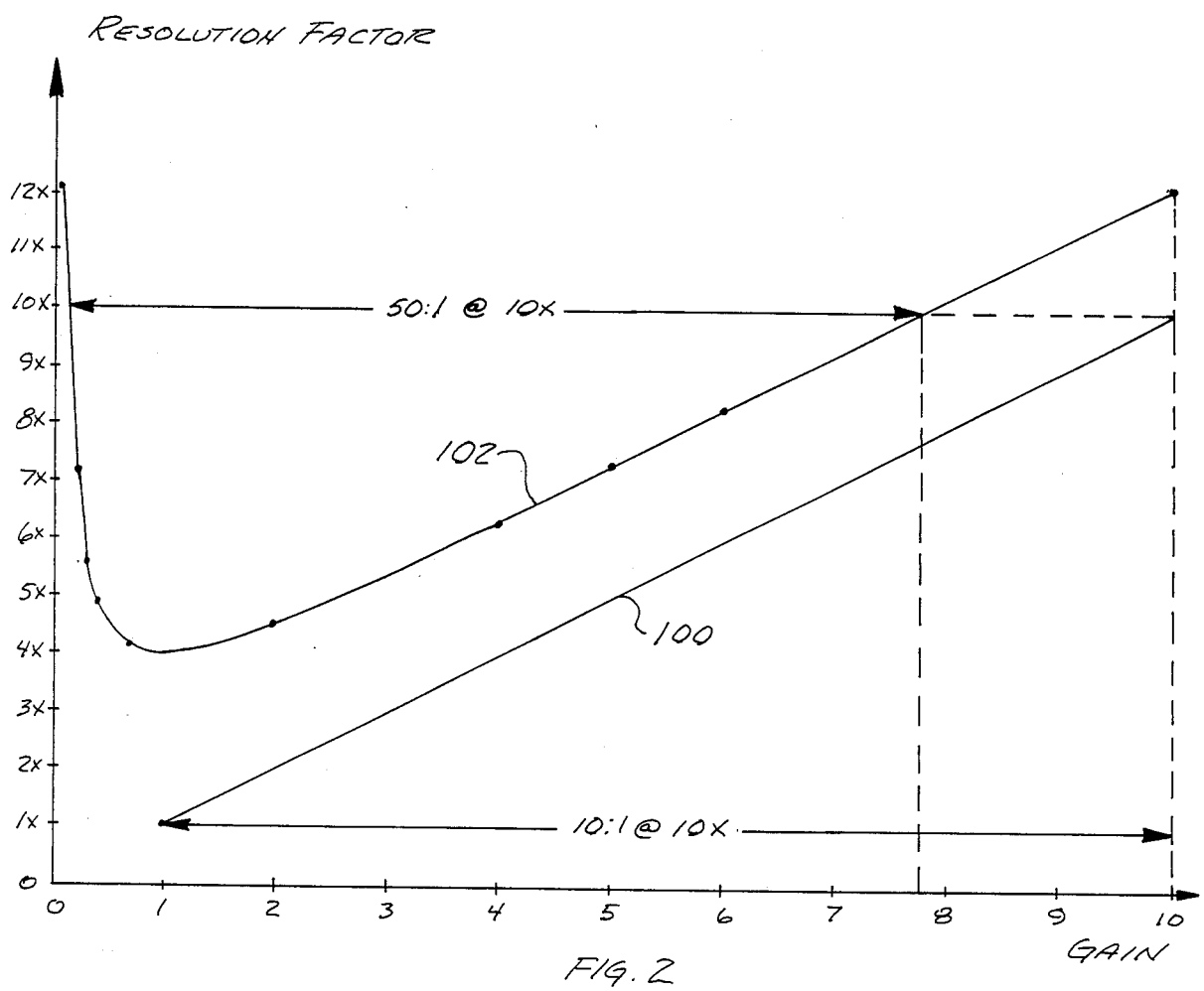
FIG. 2 is a graphical representation of resolution factor as a function of gain for both a prior art transmitter and a transmitter made according to this invention.

The output resolution of the gain adjusting circuit is equal to the potentiometer resolution (delta $R/(R1+R2)$) multiplied times a resolution factor ($(R1+R2)/R2$). Both the gain of the circuit and the resolution factor of the circuit are controlled by the adjustment of the potentiometer. The resolution factor of the circuit as a function of the gain of the circuit is depicted graphically by line 100 in FIG. 2. By way of an example, if a potentiometer is used that has a resolution delta $R/(R1+R2)$ equal to 0.02% and the output resolution of the transmitter must be less than or equal to 0.2% to provide accurate calibration adjustment, then the potentiometer will only provide that much output resolution where the resolution factor is less than or equal to 10 as determined by Eq. 2. Referring now to FIG. 2, it can be seen that for a resolution factor of 10 or less the gain can be adjusted from a maximum of 10 to a minimum of 1. This limits the turn down ratio of such a prior art transmitter to 10:1 to achieve the desired resolution in calibration using a potentiometer with limited resolution. Thus, at a turndown ratio of 10:1, the resolution of the span adjustment is degraded by a factor of 10 at the lowest span setting. If a potentiometer with a different resolution is used, or if a different output resolution is desired, a correspondingly different turn-down ratio will be obtained with the prior art device.

Switches and jumpers have been added in prior art transmitters to break the adjustment range into smaller segments to increase the range of transmitter adjustment. This method has not provided a satisfactory solution. The switches or jumpers add cost to the transmitter and opening the housing to gain access to the switches or jumpers exposes the transmitter's electronics to the deleterious effects of humidity and corrosion in the process control environment.

Improvements in manufacturing techniques has produced improved sensors which are operable over a wider range of pressures. An improved span adjustment with a larger turn-down ratio is desired to make full use of this wider sensor rangeability without the use of switches or jumpers.

Figure 3:
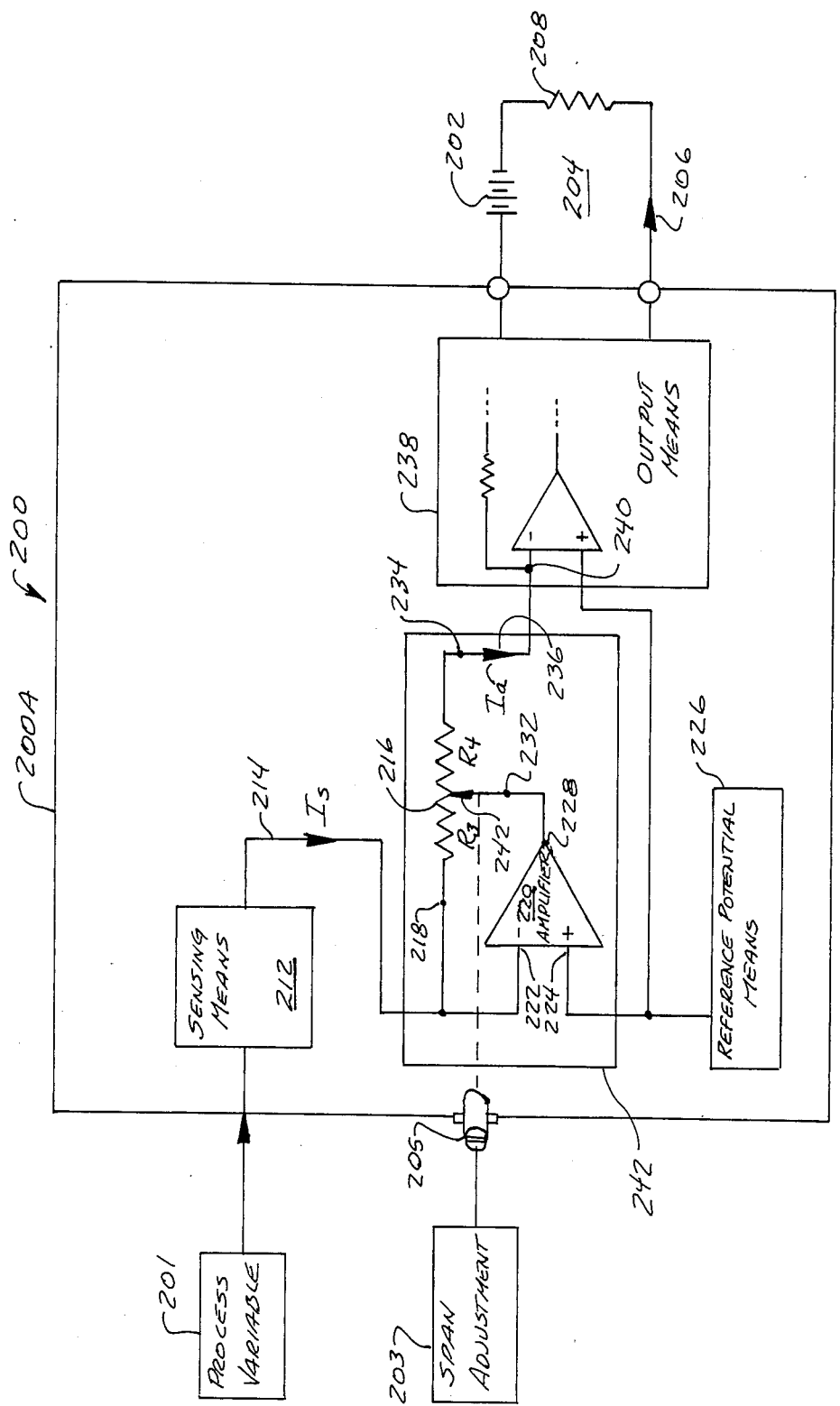
FIG. 3 is a part schematic, part block diagram representation of a transmitter according to this invention.

In FIG. 3, a transmitter 200 made according to this invention senses a process variable 201 such as temperature, pressure, or flow in a process plant. The transmitter 200 is a loop-power transmitter which is energized by a power source 202 in the 4-20 mA industrial process control loop 204. The amplitude of a 4-20 mA current 206 flowing in the loop is controlled by transmitter 200 according to the sensed process variable. A resistance 208 is included in loop 204 and is representative of a device for receiving the 4-20 mA signal such as a meter, loop amplifier, or recorder. The transmitter 200, power source 202, and resistance 208 are coupled together in a series circuit. Transmitter 200 is sealed in a closed housing 200A to protect the electronic components from damage by the harsh process control environment. The transmitter span adjustment 203 is coupled through a drive coupling 205 sealed in the transmitter's housing so that adjustment can be made without opening the housing.

A sensing means 212 comprises a sensor and associated circuitry for providing a sense current 214 proportional to the sensed process variable. The sensing means 212 senses the process variable over a wide range of input spans, for example, a 12:1 range of spans. A potentiometer 216 receives the sense current 214 at a first terminal 218. An operational amplifier 220 has an inverting input 222 coupled to first terminal 218 for sensing a potential at terminal 218. The input 222 is a high impedance input so that substantially all of sense current 214 flows into first terminal 218 of the potentiometer. A non-inverting input 224 of the amplifier 220 is coupled to a reference potential 226 in the transmitter. An output 228 of amplifier 220 is coupled to wiper terminal 232 of potentiometer 216. A span-adjusted current 236 flows out of terminal 234 of potentiometer 216 and into a summing junction 240 of an output means 238. The summing junction 240 is held at substantially the same potential as input 224 by feedback within output means 238. Potentiometer 216 presents a variable impedance R3 between terminals 218 and 232; potentiometer 216 presents a variable impedance R4 between terminals 232 and 234; and potentiometer 216 presents a substantially fixed resistance (R3+R4) between terminals 218 and 234. The potentiometer 216 thus comprises a first impedence means having a first impedence R4 coupled between the output of amplifier 220 and the output means 238. The potentiometer 216 further comprises a second impedance means having second impedance R3 coupled between output 228 and input 222.

The resistance R3 is in a feedback loop between the output 228 and the input 222 of amplifier 220. Resistance R3 controls the ratio of signal voltage at output 228 to sense current 214. The resistance R4 controls the ratio of span-adjusted current 236 to the signal voltage at the output 228. Adjustment of the span adjustment potentiometer 216 therefore adjusts these two ratios simultaneously and provides a desired relationship between the gain and the resolution factor of the transmitter, as explained below. The amplifier 220 and the potentiometer 216 comprise span-controlling means 242 which receives the sensed current 214 and provides a span-adjusted current 236. The gain of the span-controlling means 242 is the ratio (delta Ia/delta Is) which is controlled by the potentiometer adjustment substantially according to the formula:

$$\text{Gain} = \frac{\text{delta } Ia}{\text{delta } Is} = \frac{R3}{R4} \quad \text{Eq. 3}$$

The span of transmitter 200 is a ratio of a change of output current to a change of input pressure. In this transmitter it is desirable to adjust the span so that the transmitter is adaptable to a wide range of input pressures to utilize the wide range of the input sensor. For example, when the transmitter 200 is used in one application, it may be desirable to have a 16 mA change in output current represent a 2 psi input pressure change but when the same transmitter 200 is used in another application, it must be adjusted so that a 16 milliampere change in output current represents a 100 psi input pressure change. In this transmitter 200 it is desirable to adjust (calibrate) the transmitter's span with a high degree of resolution over a wide range of span settings. In the transmitter depicted in FIG. 3 the output resolution (delta Is/Is) of the span-controlling means 242 is found to be:

$$\frac{\text{delta } Is}{Is} = \frac{\text{delta } R}{R3 + R4} \cdot \left(2 + \frac{R3}{R4} + \frac{R4}{R3}\right) \quad \text{Eq. 4}$$

The output resolution of the span-controlling means 242 is equal to the potentiometer resolution (delta R/(R3+R4)) multiplied times a resolution factor (2+(R3/R4)+(R4/R3)). Both the gain of the circuit and the resolution factor of the circuit are controlled by the adjustment of the potentiometer 216. The resolution factor of the circuit as a function of the gain of the circuit is depicted graphically by curve 102 in FIG. 2. By way of an example, if a potentiometer is used that has a resolution $\Delta R/(R3+R4)$ equal to 0.02% and the output resolution of the transmitter must be less than or equal to 0.2% to provide accurate calibration adjustment of the span, then the potentiometer will provide that much output resolution (0.2%) where the resolution factor is less than or equal to 10 as determined from Eq. 4. Referring now to FIG. 2 it can be seen that for a resolution factor of 10 or less the gain can be adjusted from a maximum of 10 to a minimum of 0.2. The turndown ratio of the transmitter 200 is therefore the ratio of the upper gain setting to the lowest gain setting or 50:1. As can be seen from the curve 102, the resolution factor is a nonlinear function of the gain. The span-controlling means 242 provides a wide range of adjustment of the span of the transmitter without excessive limitation on the turndown ratio of the transmitter. The high turndown ratio permits use of the wide span range of span of the sensing means 212.

Figure 4:
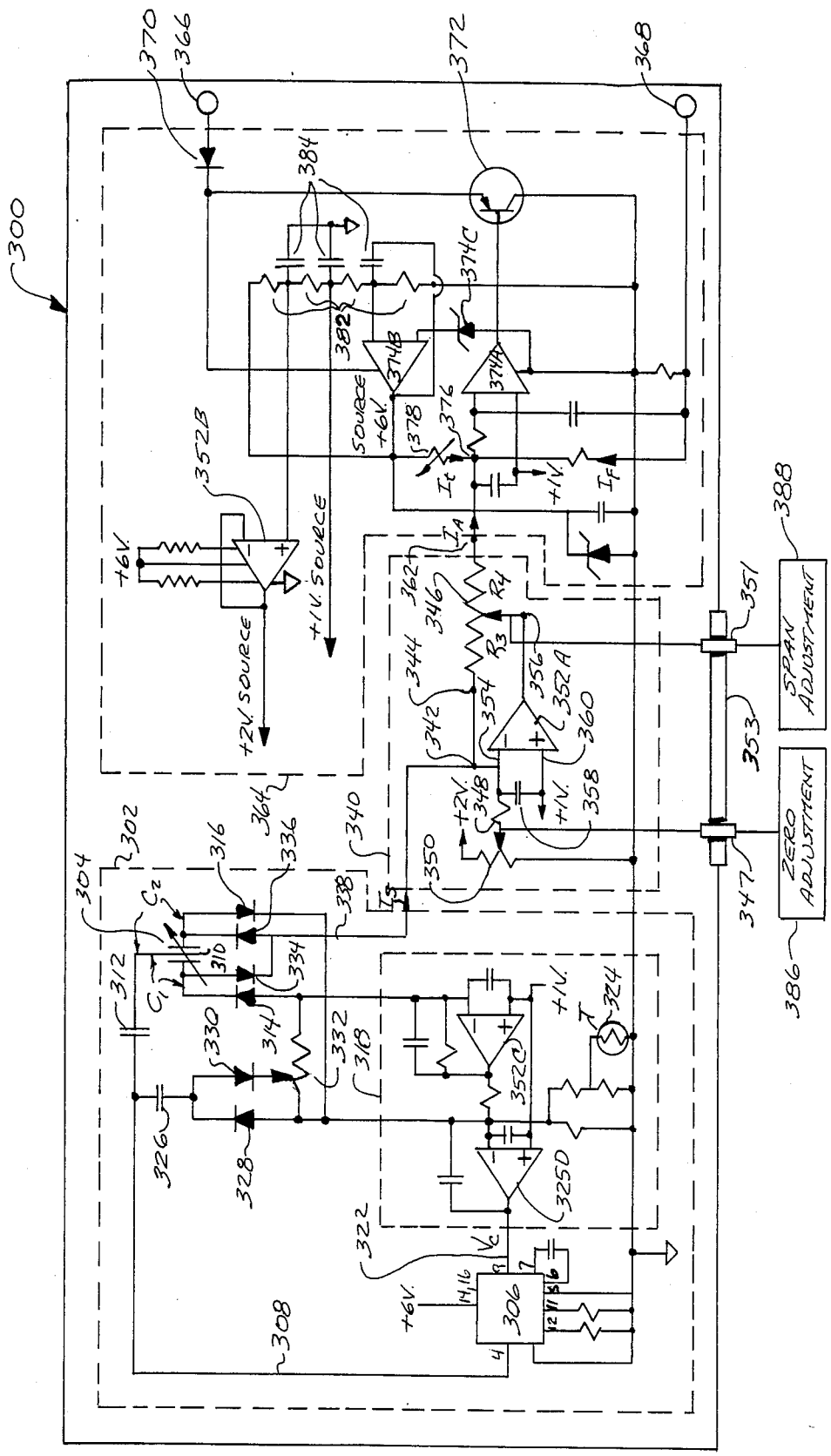
FIG. 4 is a schematic diagram of a capacitive pressure transmitter made according to this invention.

In FIG. 4, a schematic diagram of a transmitter 300 which capacitively senses a differential pressure is shown. A differential pressure sensing means 302 includes a capacitive differential pressure sensor 304. Pressure sensor 304 may be constructed as shown in my issued U.S. Pat. No. 3,793,885, included herein by reference, for example, to provide a pair of capacitances C1 and C2 which vary according to the differential pressure P applied to sensor 304. A voltage-controlled oscillator (VCO) 306 is an integrated circuit VCO such as Motorola type MC14046 and provides excitation on conductor 308 which is coupled to the moving plate 310 of sensor 302 through fixed capacitor 312. Diodes 314 and 316 couple currents from the fixed capacitor plates of sensor 302 to control circuit 318. Control circuit 318 senses the currents from diodes 314 and 316 and provides an output Vc on conductor 322 representative of these currents.

The output Vc on conductor 322 is coupled to VCO 306 to control the frequency of the VCO's excitation signal on conductor 308. A thermistor 324 in the control circuit 318 is a means for stabilizing the operation of transmitter 300 over a desired range of operating temperatures. Fixed capacitor 326, diodes 328 and 330 and potentiometer 332 are coupled together to form a linearity adjustment circuit and potentiometer 332 is adjusted to provide a more linear relationship between the sensed pressure and the excitation frequency. The VCO 306, sensor 304, diodes 314 and 316, the linearity adjustment circuit and the control circuit 318 are coupled together in a closed-loop fashion as shown in FIG. 4 to provide an excitation signal on conductor 308 with a substantially fixed amplitude and a frequency representative of the applied pressure P. Diodes 334 and 336 are coupled from the sensor 304 to a conductor 338 and provide a sense current Is representative of the sensed pressure P.

The sense current Is is coupled via conductor 338 to a span-controlling circuit 340. In circuit 340, the current Is is received at a summing junction 342. The summing junction also receives a current from terminal 344 of span adjustment potentiometer 346 and a current coupled from a zero adjustment circuit comprising fixed resistor 348 and zero adjustment potentiometer 350 as shown in FIG. 4. An amplifier 352A has an inverting input 354 coupled to the summing junction 342 for sensing the potential at the summing junction. The input 354 of amplifier 352 is a high impedance input and substantially all of the current from the zeroing network plus the current Is from the sensing means flows into terminal 344 of the span adjustment potentiometer 346. An adjustable contact 356 of potentiometer 346 is coupled to the output of amplifier 352A. A non-inverting input of amplifier 352A is coupled to a +1 volt reference potential in the transmitter. A bypass capacitor 358 is coupled between the inverting input 354 and the non-inverting input 360 to minimize the effects of noise and provide a smooth output from the transmitter. A terminal 362 of the span adjusting potentiometer 346 supplies an adjusted output current Ia to the output means 364. The span adjustment potentiometer 346 and the zero adjustment potentiometer 350 each have sealed adjustment screws 347, 351 that are accessible from the outside of a housing 353 around the transmitter, permitting adjustment of the span and zero of the transmitter without removing a cover on the transmitter.

Operation of span-controlling circuit 340 is similar to the operation of span adjustment circuit 242 of FIG. 2 and Eq. 3 and Eq. 4 above also apply to the span adjustment circuit 340. Resistance R3 of potentiometer 346 is connected in a feedback loop around amplifier 352 to control gain. Resistance R4 of potentiometer 346 is in a feed-forward circuit between wiper 356 and output means 364 to control current Ia. Resistance R3 and R4 vary oppositely as potentiometer 346 is adjusted. When R3 increases, R4 decreases and vice versa. The arrangement with oppositely varying resistances controlled by a span adjustment, one in a feedback loop and one in a feed-forward path provides the desired high turndown ratio.

The output means 364 receives the span-adjusted current Ia and provides a 4-20 mA output current at terminals 366 and 368. The amplitude of the output current is controlled by the span-adjusted current Ia. The transmitter is powered by the 4-20 mA current loop and output means 364 also includes supply means for energizing the transmitter 300 from the loop. Loop current flows into the transmitter circuitry through rectifier 370 which provides protection against reverse polarity currents. Transistor 372 controls loop current in response to a signal applied by amplifier 374A. Amplifier 374A senses a potential at summing junction 376. Span-adjusted current Ia and a current If representative of loop current flow into summing junction 376. A factory-trimmable resistance 378 also provides a substantially fixed current. It into the summing junction 376. The resistance of resistor 378 is factory-trimmed to reduce interaction between the span-adjustment and the zero adjustment. Reference diode 374C and amplifier 374B comprise supply means and provide a regulated potential designated as "+6 V SOURCE" in FIG. 4 which is coupled to transmitter circuitry at points designated "+6 V", such coupling not being shown in FIG. 4 to provide clarity. A resistive divider network 382 is connected to the +6 V SOURCE and provides other regulated potentials to the transmitter circuitry. Bypass capacitors 384 are coupled to divider network 382 to reduce noise levels in the divider network 382. A +1 V SOURCE potential is generated by the divider and is coupled to transmitter circuitry at points designated "+1 V". A buffer amplifier 352B receives a potential from the divider network 382 and provides a regulated potential "+2 V SOURCE" which is routed to points in the transmitter's circuitry designated "+2 V".

Amplifiers 352A, 352B, 352C and 352D are portions of a quad amplifier integrated circuit such as a type LM246 made by National Semiconductor. Amplifiers 374A and 374B and reference diode 374C are portions of a type LM10 integrated circuit made by National Semiconductor.

The transmitter's circuitry is enclosed in a sealed housing 353 and connections are made to the transmitter at terminals 366 and 368 without opening the electronics housing. Zero adjustment 386 and span adjustment 388 are received at sealed adjustment screws 347 and 351 without opening the housing. The transmitter 300 may thus be installed and also adjusted in a hostile process control atmosphere without exposing the circuitry to the environment.

While the invention has been described in terms of a potentiometer control of the span-adjustment, it will be understood by those skilled in the art that other impedance means with limited resolution, such as D/A converters, or switching circuits may also be used within the scope of this invention.

What is claimed is:

1. A transmitter for sensing a process variable and for providing a corresponding two-wire output signal on a two-wire output which can be adjusted in value by a span adjuster comprising:
   sensing means coupled to the process variable for providing a sensor output signal current at an output thereof representative of the process variable;
   span-controlling means for controlling the two-wire output signal coupled to the span adjuster and having an input electrically connected to the sensor output and having an output where a controlled signal is provided, the span-controlling means further comprising first and second impedance means the impedance values of which can be selectively changed by the span adjuster to thereby adjust the span such that changes in the controlled signal due to changes in the sensor output signal are related thereto by a first relationship between the impedance values of the first and second impedance means and such that changes in the controlled signal due to changes in the impedance values of the first and second impedance means because of adjustments to the span adjuster are related thereto by a second relationship between the impedance values of the first and second impedance means differing from the first relationship, the total of the impedance values of the first and second impedances being substantially constant; and
   output means having an input electrically connected to the span-controlling means output for receiving the controlled signal and providing the corresponding two-wire output signal on the two-wire output.

2. The transmitter of claim 1 wherein the span-controlling means further comprises amplifier means having an input and an output coupled to the first and second impedance means for amplifying the sensor output.

3. The transmitter of claim 2 wherein the amplifier means comprises at least first and second amplifiers and the first impedance means is coupled between the first amplifier output and the second amplifier input.

4. The transmitter of claim 3 wherein the second impedance means is coupled between the first amplifier input and the first amplifier output.

5. The transmitter of claim 3 wherein the first and second impedance means together comprise a potentiometer.

6. The transmitter of claim 3 wherein the sensor output signal current is supplied directly to the first amplifier input.

7. A transmitter for sensing a process variable and for providing a two-wire output adjusted by a span adjustment, comprising:
   sensing means coupled to the process variable for providing a sensor output representative of the process variable;
   output means coupled to the two-wire circuit for providing the two-wire output;
   span-controlling means coupled to the span adjustment for controlling the span of the two-wire output, the span controlling means comprising an amplifier having an amplifier input coupled to the sensor output and an amplifier output coupled to the output means and further comprising a potentiometer, the potentiometer having a first impedance element coupled in a feedforward path between the amplifier output and the output means and having a second impedance element coupled in a feedback path between the amplifier output and the amplifier input, the first and second impedance elements having oppositely varying impedances as a function of the adjustment such that the transmitter has a desired output resolution over a selected turndown ratio.

8. A transmitter for sensing a process variable and for providing a two-wire output adjusted by a span adjustment, comprising:
   sensing means coupled to the process variable for providing a sensor output representative of the process variable;
   span-controlling means coupled to the sensor output for controlling the two-wire output and having a potentiometer coupled to receive the span adjustments with the potentiometer having a first impedance means on one side of an adjustable tap and having a second impedance means on the other side of the adjustable tap such that the adjustable tap, in being moved, can increase one or the other of the first and second impedances while decreasing the other, the span-controlling means further comprising an amplifier with the second impedance means coupled between the amplifier's input and the amplifier's output through having the adjustable tap coupled to the amplifier's output with the second impedance means also coupling to the sensor output such that the two-wire output has an increased resolution as a function of the span adjustment; and output means for providing the two-wire output, the output means being coupled to the span-controlling means through having the first impedance means coupled between the amplifier's output and the output means.

9. The transmitter of claim 8 wherein the resolution of the two-wire output as a function of the span adjustment is substantially $$\frac{\text{delta } R}{(R3 + R4)} \cdot (2 + R3/R4 + R4/R3)$$

where delta R is the resolution of the potentiometer and R3 is the first impedance and R4 is the second impedance.

10. The transmitter of claim 9 wherein the process variable is pressure.

11. The transmitter of claim 10 wherein the sensing means include at least one capacitive sensor.

12. The transmitter of claim 11 wherein the transmitter is energized by a 4 to 20 milliampere current.

13. The transmitter of claim 12 wherein the transmitter output has a resolution of at least 0.05% over a 12:1 turndown rate.

* * * * *